US008223747B2

(12) United States Patent
Yarlagadda et al.

(10) Patent No.: US 8,223,747 B2
(45) Date of Patent: Jul. 17, 2012

(54) PREDICTIVE COMMUNICATION ROUTING SCHEME USING INSTANT MESSAGING PREFERENCES AND/OR SETTINGS FOR ROUTING PACKET TRAFFIC FOR VOICE, VIDEO AND OTHER MULTIMEDIA COMMUNICATIONS (75) Inventors: Madhu Yarlagadda, Los Altos Hills, CA (US); Warren Wan, Pasadena, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1221 days.

(21) Appl. No.: 11/056,485

(22) Filed: Feb. 10, 2005

(65) Prior Publication Data

US 2006/0023695 A1 Feb. 2, 2006

Related U.S. Application Data (60) Provisional application No. 60/544,914, filed on Feb. 13, 2004, provisional application No. 60/544,880, filed on Feb. 13, 2004.

(51) Int. Cl.
*H04L 12/66* (2006.01)
(52) U.S. Cl. .................. 370/352; 370/351; 370/360
(58) Field of Classification Search .......... 370/351, 370/360, 395.31, 352, 459; 379/207.06, 379/207.07, 207.08, 274
See application file for complete search history.

(56) References Cited

U.S. PATENT DOCUMENTS

| 6,301,609 | B1* | 10/2001 | Aravamudan et al. ........ 709/207 |
| 6,697,474 | B1* | 2/2004 | Hanson et al. ........... 379/201.01 |
| 6,868,080 | B1 | 3/2005 | Umansky et al. |
| 7,058,036 | B1* | 6/2006 | Yu et al. ........................ 370/335 |
| 2002/0075303 | A1* | 6/2002 | Thompson et al. ........... 345/751 |
| 2003/0208545 | A1* | 11/2003 | Eaton et al. .................... 709/206 |
| 2005/0037762 | A1* | 2/2005 | Gurbani et al. ............... 455/445 |
| 2005/0069121 | A1* | 3/2005 | Faruque et al. ............... 379/225 |
| 2005/0086211 | A1* | 4/2005 | Mayer .............................. 707/3 |
| 2005/0259798 | A1 | 11/2005 | Yarlagadda et al. |
| 2006/0072726 | A1 | 4/2006 | Klein et al. |

FOREIGN PATENT DOCUMENTS

CN 1313694 A 9/2001
(Continued)

OTHER PUBLICATIONS

International Search Report mailed on Aug. 4, 2006, for PCT Application No. PCT/US05/04700 filed Feb. 11, 2005, five pages.

(Continued)

*Primary Examiner* — Curtis Kuntz
*Assistant Examiner* — Yosef K Laekemariam
(74) *Attorney, Agent, or Firm* — James J. DeCarlo; Greenberg Traurig, LLP (57) ABSTRACT Techniques for using instant messaging preferences and settings are used for predictive communications, including routing of data traffic, are provided. A voice call can be routed over a packet-based network if a voice network is not available, or for other reasons. In addition to voice calls, embodiments of the invention can route video calls, multimedia communications and other communications. In some implementations, an instant message presence can be queried for in determining how to route a voice-over-IP or PSTN telephone call. Thus, a call might be routed to a computer or computing device unrelated to the location of the PSTN telephone line being called, if an associated instant messenger presence is detected on that computer or computing device.

30 Claims, 3 Drawing Sheets

FOREIGN PATENT DOCUMENTS

| | | |
|---|---|---|
| EP | 0 714 194 A2 | 5/1996 |
| EP | 0 959 638 A2 | 11/1999 |
| EP | 1 059 798 A2 | 12/2000 |
| JP | 2002-519891 | 7/2002 |
| JP | 2003-274022 | 9/2003 |
| JP | 2004-023374 | 1/2004 |
| KR | 2004 0037363 A | 5/2004 |
| WO | WO/03/101079 | 12/2003 |
| WO | WO-2004/039048 A2 | 5/2004 |
| WO | WO-2004/039048 A3 | 5/2004 |
| WO | WO-2005/079393 A2 | 9/2005 |
| WO | WO-2005/079393 A3 | 9/2005 |

OTHER PUBLICATIONS

Notice of Preliminary Rejection mailed on Jul. 17, 2008, for Korean Application No. 10-2006-7016206, filed on Feb. 11, 2005, four pages.

Notice of Preliminary Rejection mailed on Jul. 17, 2008, for Korean Application No. 10-2006-7016206, filed on Feb. 11, 2005, two pages. (English Translation.).

Supplementary European Search Report mailed on Jan. 5, 2009, for EP Application No. EP 05713546.9 filed Feb. 11, 2005, three pages.

\* cited by examiner

PREDICTIVE COMMUNICATION ROUTING SCHEME USING INSTANT MESSAGING PREFERENCES AND/OR SETTINGS FOR ROUTING PACKET TRAFFIC FOR VOICE, VIDEO AND OTHER MULTIMEDIA COMMUNICATIONS

CROSS-REFERENCES TO RELATED APPLICATIONS

This application claims the benefit of the filing date of U.S. Provisional Patent Application No. 60/544,914 filed Feb. 13, 2004 and U.S. Provisional Patent Application No. 60/544,880 filed Feb. 13, 2004, both of which are incorporated by reference in their entirety for all purposes.

This application is related to U.S. application Ser. No. 11/056,212, entitled "INTEGRATED INSTANT MESSAGING, ROUTING AND TELEPHONE SERVICES BILLING SYSTEM", filed concurrently, and hereby incorporated by reference for all purposes.

BACKGROUND OF THE INVENTION

The present invention relates generally to communications, in particular to routing communications using instant messaging.

A common problem with telephone communications is a busy signal. If a home has one telephone line and it is being used, other calls cannot come through. Some subscribers might have "call waiting" wherein a signal is received that signals an additional incoming call, but typically two calls cannot be taken at once, such as by two people in a household, without a second telephone line.

This is also a problem where the telephone line is occupied by a computer communications session, such as where a modem is using the telephone line. In these cases, there are services, either client-based or server-based, that are used to signal that the incoming call is waiting. For client-based computer call waiting, the user's computer that is using the modem notices a call waiting signal on the line from the telephone company and executes a program to signal the user that a call is coming in. The user can then drop the modem connection and allow the caller to call back in or might be able to catch the caller. For server-based computer call waiting, the fact of a busy signal is communicated from the telephone company's voice system to a server that then initiates a signal through a computer communications system that routes the signal to the user who is on-line.

BRIEF SUMMARY OF THE INVENTION

In embodiments of the present invention, instant messaging preferences and settings are used for predictive communications, including routing of data traffic. For example, a voice call can be routed over a packet-based network if a voice network is not available, or for other reasons. In addition to voice calls, embodiments of the invention can route video calls, multimedia communications and other communications. In some implementations, an instant message presence can be queried for in determining how to route a voice-over-IP or PSTN telephone call. Thus, a call might be routed to a computer or computing device unrelated to the location of the PSTN telephone line being called if an associated instant messenger presence is detected on that computer or computing device.

In one embodiment, a method for routing calls for a number using an instant message (IM) server is provided. The method comprises: receiving a call for the number from a PSTN telecommunications device; determining routing preferences for the number, the routing preferences indicating if the call should be routed to one or more IM usernames associated with the number; determining if any of the one or more IM usernames associated with the number are on-line; and ringing the on-line IM usernames for the call.

In another embodiment, a method for routing calls for a number is provided. The method comprises: receiving a call for the number; determining routing preferences for the number, the routing preferences indicating if the call should be routed to IM clients associated with the number; and if the preferences indicate the call should be routed to the IM clients, routing the call for the number to an IM server, wherein the IM server is configured to determine if any instant messaging (IM) usernames associated with the number are on-line and if so, ring the on-line IM usernames for the call.

In yet another embodiment, a system for routing calls is provided. The system comprises: a telecommunications device configured to receive a PSTN call; an IM server comprising logic configured to: determine routing preferences for the number, the routing preferences indicating if the call should be routed to one or more IM usernames associated with the number; determine if any of the one or more IM usernames associated with the number are on-line; and ring the on-line IM usernames for the call.

A further understanding of the nature and the advantages of the inventions disclosed herein may be realized by reference of the remaining portions of the specification and the attached drawings.

DETAILED DESCRIPTION OF THE INVENTION

Figure 1:
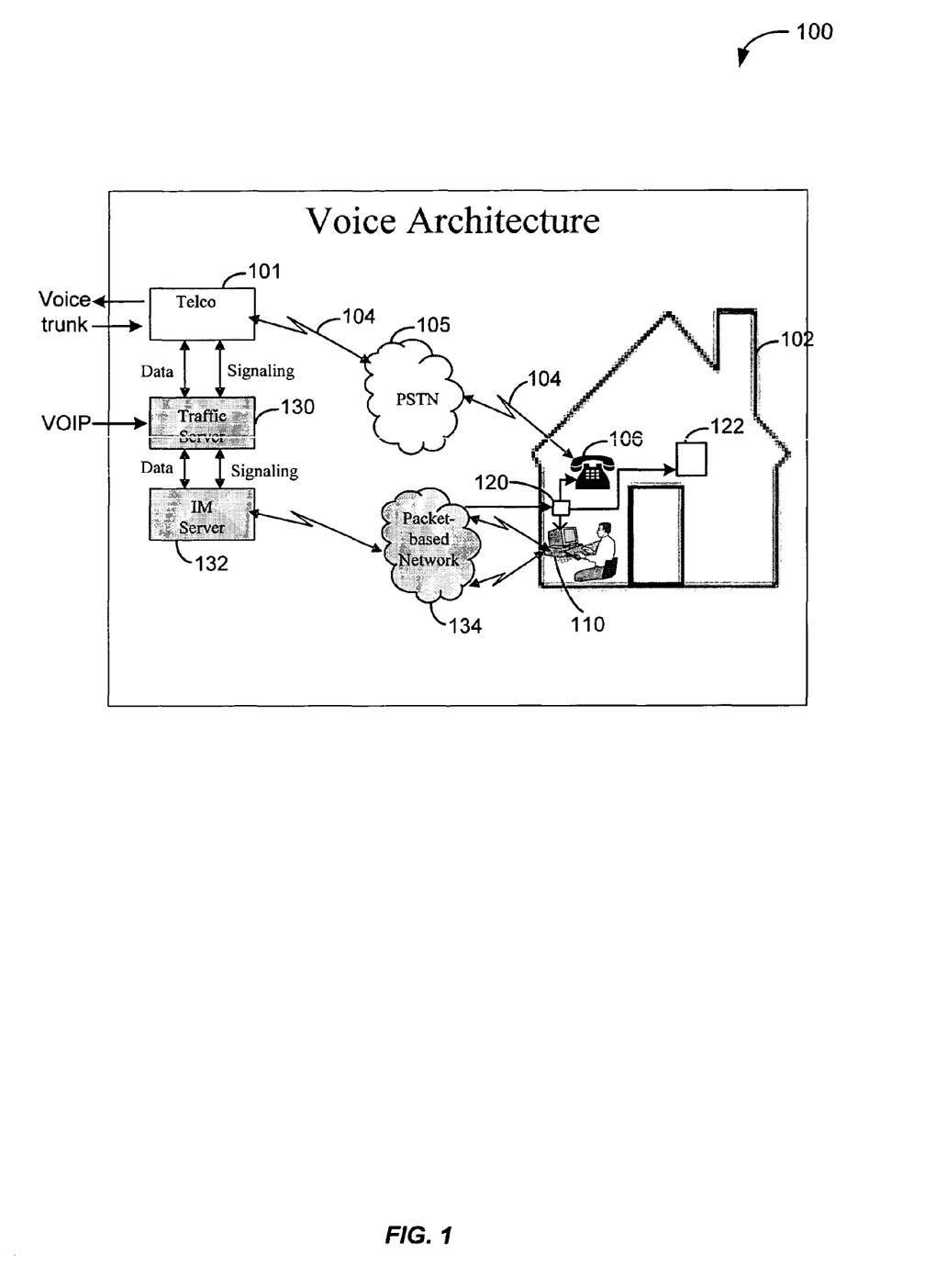
FIG. 1 depicts a system that provides a routing of data traffic according to one embodiment of the present invention.

FIG. 1 depicts a system 100 that provides a routing of data traffic according to one embodiment of the present invention. As shown, a telco 101, traffic server 130, and an IM server 132 are provided to route data traffic. In one embodiment, data traffic routed may be voice calls, video calls, multimedia communications and other communications. For example, voice calls may be routed through a PSTN (public switched telephone network) 105 or a packet-based network 134. Although voice calls will be described, it will be recognized that embodiments of the present invention can route other types of data traffic. For example, embodiments of the invention can route video calls, multimedia communications and other communications.

In one embodiment, a system may send voice calls to telco 101. For example, the system may be another user using a PSTN telephone, a computing device sending voice over IP (VOIP) calls, an instant message client sending VOIP calls, etc. Telco 101 may route the voice calls through telephone lines 104 and PSTN 105 to a telephone 106. As will be described below, the call may also be routed to computing devices 110.

Telco 101 may be any telecommunications device. For example, telco 101 may be any system capable of routing PSTN voice calls. Examples of telco systems 100 include systems operated by competitive local exchange carriers (CLEC), incumbent local exchange carriers, etc., and may include switches, monitors, etc.

As shown, a telco system 101 is configured to handle voice lines from a voice trunk. When a call is to be routed to location 102, telco system 101 (such as a switch) signals over telephone line 104. If telephone 106 is on-hook (i.e., not in use), the signal triggers a ring and the call can be completed from telco 101 to handset 106.

Location 102 may be any location that includes telephone 106 and/or computing device 110. For example, location 102 may be a home, office location, etc. In one embodiment, location 102 may be a location that is associated with a telephone number or another identifier (e.g., an IM username, email addresses, etc.). For example, location 102 may be a home in which phone calls for a telephone number are routed by telco 102. Location 102 may be associated with many devices that can receive voice calls. For example, telephone 106, computing device 110, and other devices 122 are provided in location 102.

Telephone 106 may be any device capable of receiving voice calls. For example, telephone 106 may be any PSTN devices. For example, telephone 106 may be a landline phone, wireless phone, cordless phone, personal digital assistant (PDA), etc.

Computing device 110 may be any computing device configured to receive voice calls. In one embodiment, computing device 110 may include an IM client that can receive instant message communications in addition to voice calls. Computing device 110 may include a computer, personal digital assistant (PDA), workstation, laptop computer, personal computer, etc.

Other devices 122 may be any other devices that can receive voice calls.

In one embodiment, computing device 110 is configured to receive VOIP calls. Although computing device 110 is shown in location 102, it will be recognized that computing device 110 may be remotely located from location 102. For example, a user may use an IM client on computing device 110 to receive calls from a remote location. Thus, a user may have a username that is associated with location 102. That user may log on to an IM client at any location and receive calls for a telephone number associated with location 102.

Calls may be received through PSTN network 105 or packet-based network 134. PSTN network 105 is configured to send voice calls over a plain old telephone system (POTS) or PSTN. IM server 132 is configured to send voice calls over a packet-based network. A packet-based network 134 may include an IP (Internet protocol) network, asynchronous transfer mode (ATM) network, frame relay network, wireless network, etc.

Traffic server 130 is configured to receive signaling from telco 101. For example, a call may be received by telco 101. Telco 101 may be configured to send the voice call to telephone 106 through PSTN network 105. Additionally, telco 101 has the option to send the call to an IM client running on computing device 110 through traffic server 130, IM server 132, and packet-based network 134. In this case, the voice call may be routed to traffic server 130. Traffic server 130 is then configured to determine an IM server 132 that can deliver the voice call to the IM client at computing device 110. Different IM servers 132 may be configured to deliver information to IM clients at location 102. Traffic server 130 determines an appropriate IM server 132 and sends the voice call to IM server 132.

IM server 132 is then configured to send the voice call to one or more IM clients associated with location 102 through packet-based network 134. IM server 132 is configured to provide IM-related services to IM clients on computing devices 110. For example, IM clients may conduct IM conversations with other IM clients through IM server 132. In general, IM clients are associated with usernames. The usernames are identifiers for various users. For example, the IM usernames may be a login ID such as a Yahoo! IM identifier, etc. The IM username may be associated with a location 102. For example, if a family lives at location 102, IM usernames for every member of the family may be associated with location 102. IM server 132 may communicate with each IM username associated with location 102.

In one embodiment, IM server 132 may send voice calls received from traffic server 130 to IM usernames. IM server 132 may be configured to ring IM usernames when a telephone call is received for a telephone number. For example, IM usernames may be associated with a telephone number for location 102. When a voice call is received for that telephone number, IM server 132 may be contacted with an indication that a voice call has been received for that telephone number. IM server 132 may then detect which IM usernames are on-line and then ring the IM clients that are on-line.

Accordingly, presence information may be used to determine which IM clients are on-line. In one embodiment, the presence information may indicate that an IM client is offline or on-line. There may also be various statuses, such as busy, away, etc. IM server 132 may be configured to ring an IM client based on the status, such as an IM may be rung if a status is "away" but not rung if the status is "busy".

The voice calls may be routed through a router 120 at location 102. Router 120 may route the calls to telephone 106, computing device 110, or other devices 122. The network connection at location 102 may be a dial-up line, broadband, such as via a DSL filter, or router 120, etc. Also, as mentioned above, the usernames may be logged on IM clients remote from location 102. These calls may be routed appropriately and may not go through location 102.

A voice call is thus routed from an IM server 132 through packet-based network 134 to IM clients on computing devices 110 when a call is received for a telephone number. Various scenarios of how voice calls are routed to telephone 106 and IM clients at location 102 will now be discussed.

Figure 2:
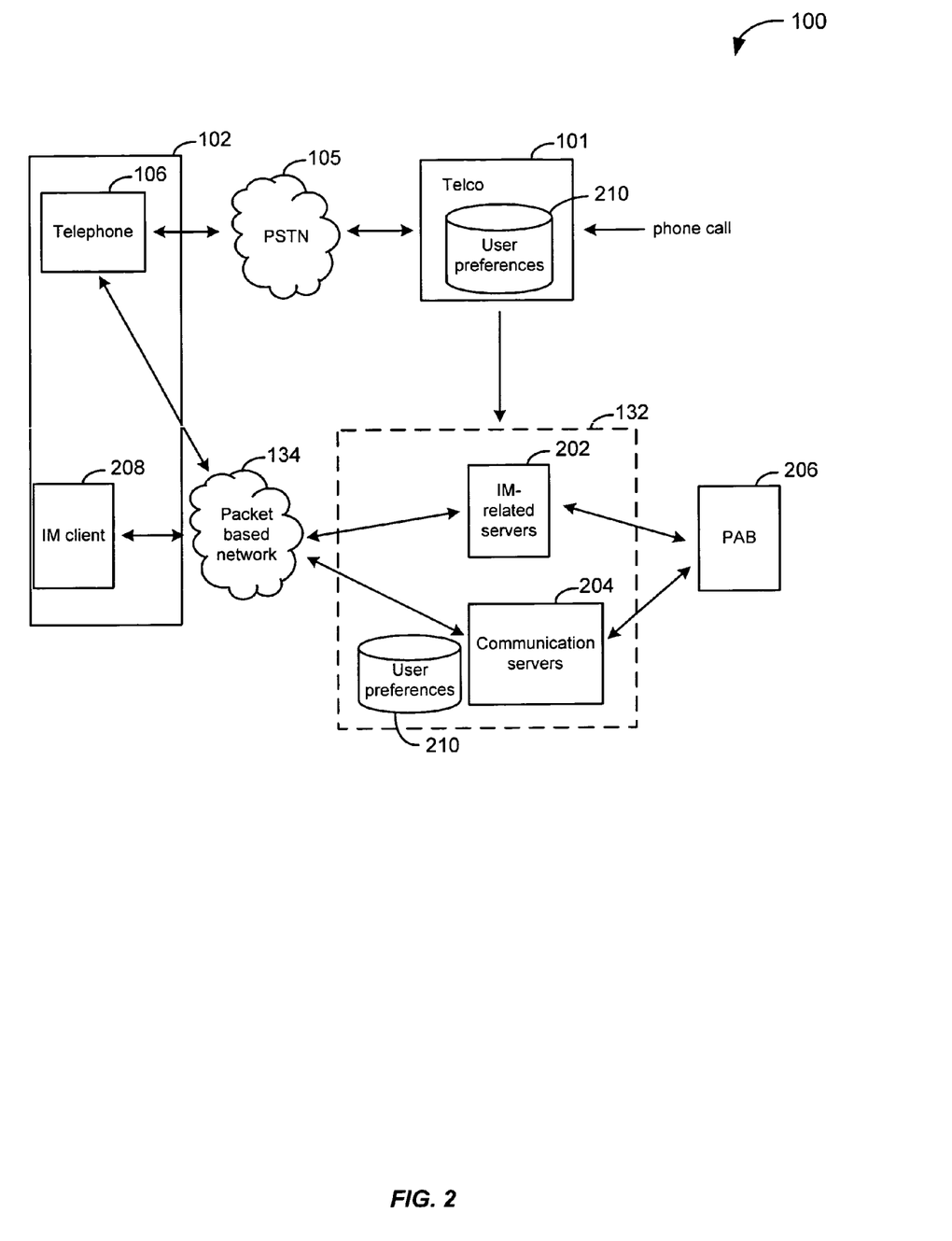
FIG. 2 shows a more detailed embodiment of the system according to embodiments of the present invention.

FIG. 2 shows a more detailed embodiment of system 100 according to embodiments of the present invention. In one embodiment, a voice call may be received at telco 101. The voice call may be routed according to user preferences stored in a database 210. In one embodiment, the user preferences may indicate that, if telephone 106 is busy, the voice call should be routed to IM server 132 for routing to IM clients 208. In another embodiment, the user preferences may indicate that an incoming voice call is automatically routed to IM server 132 for routing to clients 208 and/or telephone 106.

If the user preferences indicate that voice calls for a telephone number should be automatically routed to IM server 132, telco 101 receives a voice call and routes it to IM server 132. The routing may be accomplished using call forwarding. For example, call forwarding may be set up at telco 101 such that a voice call for a telephone number is routed to an address of IM server 132. Other methods of rerouting a telephone call for a telephone number to IM server 132 will be appreciated by a person skilled in the art.

As shown, IM server 132 includes IM-related servers 202 and communications servers 204. IM-related servers 202 provide IM-related services. For example, IM-related servers 202 allow traditional IM conversations to be performed by IM clients.

Communications servers 204 are configured to route a voice call according to user preferences. User preferences may indicate how calls should be routed. For example, some user preferences may indicate that a call should be routed to an IM username if the status indicates that the user is on-line, or away. However, if the status indicates that the IM user is busy or not on-line, then the IM username may not be rung. Additionally, other preferences may be used, such as routing a call through a wireless network to a cellular telephone, ringing telephone 106, etc.

In one embodiment, communications servers 204 are configured to determine if IM usernames associated with the telephone number are logged in on an IM client 208. For example, presence information may indicate that a user is on-line. If an IM username is logged on, communications server 204 may ring the IM username at IM client 208. Additionally, communications servers 204 may ring telephone 106. The ringing may be performed through packet-based network 134 to IM client 208 and telephone 106. In another embodiment, telco 101 may also ring telephone 106 through PSTN 105.

As mentioned above, it is possible to have multiple IM clients (or usernames) associated with the same telephone number. Thus, any number of IM usernames may be rung in addition to telephone 106. The user of such device can then accept the call and handle it within the IM environment. If the user accepts the call, that fact is communicated back to traffic server 130, which then requests that the call be routed through traffic server 130 and IM server 132. If any of the IM usernames answer the call, then communications server 204 may suppress the ringing on other lines.

In another embodiment, a voice call may not be sent to communications servers 204 until a busy signal on telephone 106 is detected. For example, a user may be using a primary telephone 106 at location 102. For example, telephone 106 may be in use with a voice call through a PSTN 105 or a VOIP call through a packet-based network 134. In either situation, telco 101 may be able to detect that telephone 106 is busy. When another voice call is received at telco 101 for telephone 106, it is determined that telephone 106 is busy. User preferences may be set such that the voice call is then routed to communications server 204.

In this case, communications server 204 may route the call based on user preferences. For example, on-line IM usernames may be determined and those IM usernames may be rung. Accordingly, instead of receiving a busy signal, IM usernames may be rung. Also, even if call waiting is enabled for telephone 106, IM usernames may be rung in addition to sending a call-waiting signal to telephone 106 using communications server 204. Accordingly, traditional telephone services are extended in that, instead of receiving a busy signal or a call-waiting signal, IM usernames may be rung for a voice call. Thus, a user is not restricted to receiving one call at a time at a location 102. Rather, many calls may be taken using IM usernames. Thus, a user using telephone 106 may not tie up a telephone line using telephone 106.

When a call is answered using an IM client, the status of the username that answered the call may be changed. For example, the status may be changed to "Busy, I'm on a call", or some other status. The status may then be communicated to IM server 132, which propagates the status to other usernames.

In another example, the status for different group lists may be changed. For example, an IM client may have different groups with different buddies for a user, such as a work group list with work contacts and a personal group list with personal contacts. The status may be changed differently for the different group lists based on the person who is calling. For example, if the user is at work and receives a call, then the IM client changes the status in the work group list to busy but leaves the personal group list as on-line. In another example, if the user receives a personal call, the IM client may change the status in the personal group to busy but leave the work group list as on-line.

Communications server 204 may also provide personalized information using a personal address book (PAB) 206 for a user. Various users may have different personal address books 206. For example, a first IM username may have its own PAB 206 and a second IM username may have its own second PAB 206. A PAB 206 may include various addresses for other users. For example, entries may indicate a friend's contact information, such as their personal name, nicknames, telephone numbers and email addresses, etc.

Techniques for populating a PAB 206 for a user are described in U.S. application Ser. No. 11/056,212, entitled "INTEGRATED INSTANT MESSAGING, ROUTING AND TELEPHONE SERVICES BILLING SYSTEM", filed concurrently, which is hereby incorporated by reference for all purposes.

Figure 3:
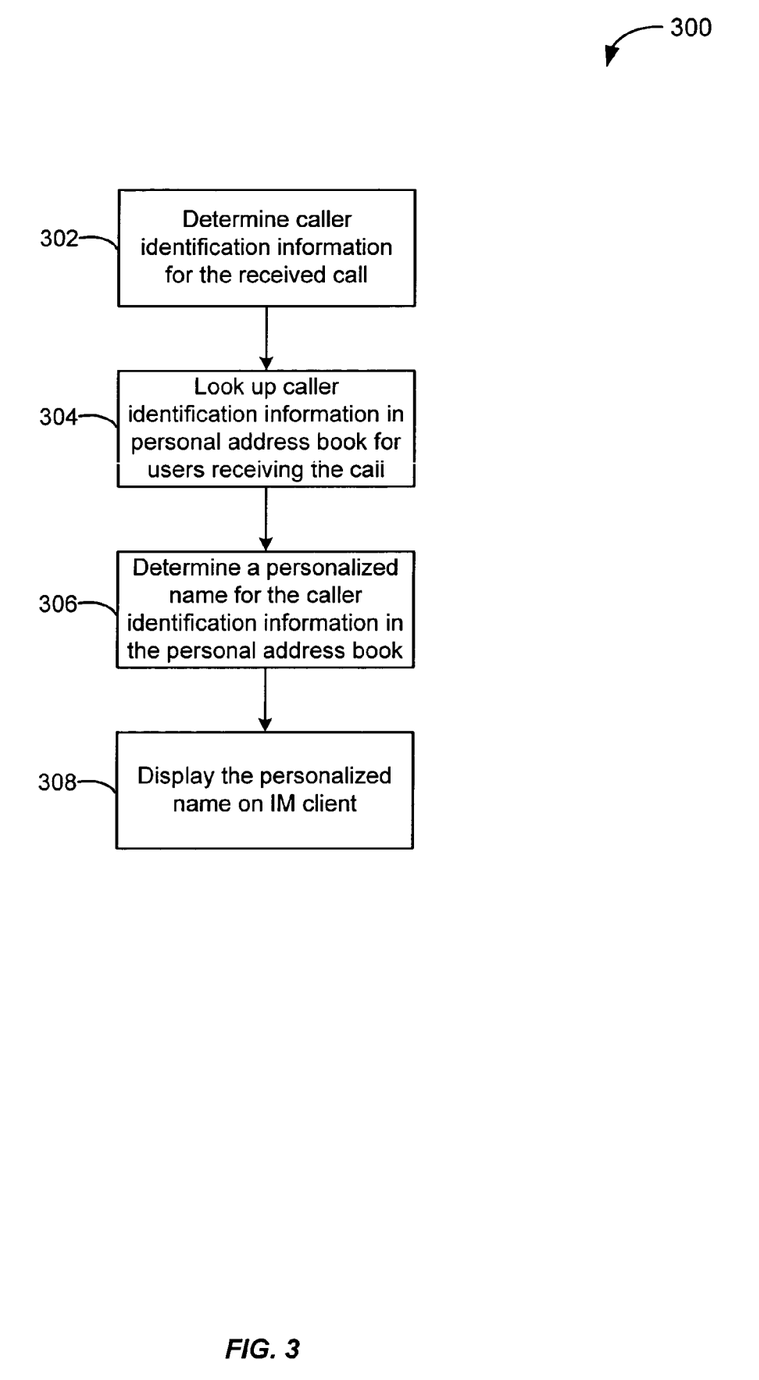
FIG. 3 depicts a simplified flowchart of using PAB information to personalize voice calls according to one embodiment of the present invention.

FIG. 3 depicts a simplified flowchart 300 of using PAB information to personalize voice calls according to one embodiment of the present invention. In step 302, caller identification information for the received voice call is determined. For example, caller ID information, such as a telephone number, may be used. The caller ID information may be provided from telco 101 to communication servers 204. For example, caller ID information may indicate a telephone number the call is being sent from, an email address the call is being sent from, or any other identifying information from where the call is being sent from.

In step 304, the caller identification information is looked up in PAB 206 for each user that may receive the voice call. For example, the personal address books for each of the IM usernames that are on-line may be looked up.

In step 306, a personalized name for the caller identification information is determined from the PAB 206 for each user. For example, a PAB 206 may include personalized names for the caller identification information. For example, a telephone number "415-555-1010" may be "Uncle Billy" in a first user's PAB 206 and also may be "Billy" in a second user's PAB 206.

In step 308, the personalized name is displayed for each IM username on an IM client 208. Additionally, the personalized name may be displayed as caller ID information on telephone 106, if possible. Accordingly, a personalized name using information in PAB 206 can be displayed. Thus, a user can easily recognize who is calling.

If an entry for the caller identification information is not found in a user's PAB 206, the information may be added to the PAB 206. The caller identification information may not be a complete listing. For example, only the telephone number may be provided. A white page/yellow page look-up using a phone directory may be performed for the caller identification information to determine other information about the caller. For example, an address of the caller may be determined. The information is then added to PAB 206.

Additionally, a user may use an IM client to query for caller identification information for any number of calls made in the last X number of days. For example, a billing system may have recorded the caller identification information received from calls to the telephone number. Communication server 204 may first look-up in the telephone directory and determine identification information for all the callers. This information may then be added to a PAB 206. A user may then personalize names for the caller identification information.

In another embodiment, communications server 204 may allow a user to personalize their own ring tones/ring back tones. For example, when a call is received from certain caller identification information, a personalized ring tone may ring. For example, if a person's parents call, a certain ring tone may be rung. If a user's girlfriend calls, another ring tone may be rung. A user may also send ring tones as gifts to friends.

Accordingly, using system 100, calls can be routed using IM clients capable of taking calls with voice inputtability and audio output. System 100 can detect when a call is busy, route the call to a server that generates an IM that can activatable by user's IM client to get the call. Then, the received part of the call can be handled as a real IP call. Calls can be routed anywhere that an IM client associated with a telephone number is on-line.

In a household, one person might be using a telephone 106 for a conventional voice call. When another call comes in, it would otherwise show as a line being busy, but instead the call is routed to IM client 208. The IM clients might be on computers that could be utilized by a user on a voice call or by others in location 102. This can be applied to locales, such as businesses, households, etc. IM routing can then be performed over an Internet connection such as dial-up or broadband, a second telephone line, etc. Accordingly, a user may not need to subscribe to call waiting services because calls may be forwarded to IM usernames that are active on IM clients.

Although the above was described as receiving a traditional voice call through a PSTN network at telco 101, it will be understood that a VOIP call may be received at traffic server 130. Traffic server 130 will then determine whether to route the call to telco 101 or to IM server 132. If the call is routed to telco 101, telco 101 can determine if telephone 106 is busy and then route the call according to the user preferences. Also, in another embodiment, traffic server 130 may route the call based on user preferences. For example, a call may be automatically routed to IM server 132. Also, traffic server 130 may automatically route the call to telco 101.

In addition to voice traffic, video, webcam (such as Yahoo! Webcam) traffic might also be supported, along with other multimedia traffic. If the system detects that both ends of a call have compatible equipment, such as both running Yahoo!'s webcam service, the protocols could switch from voice only to video calls.

Embodiments of the present invention provide many advantages. For example, by routing calls according to user preferences, users may avoid "call waiting services." Also, multiple calls to a telephone number may be received by users in a location 102. Accordingly, traditional phone services restrict a telephone line 104 to receiving one or two calls. However, any number of calls may be received using embodiments of the present invention. Multiple calls may be taken, using IM usernames at telephone 106. These calls may be routed intelligently using user preferences.

In this manner, calls can be routed as determined by IM preferences and settings. Some IM settings might indicate where to route a call in the case where a call is being routed to an IM client, but the IM client is not on-line. For example, a user might request that calls ring at home, but if the line is busy, route to IM, but if IM is not on-line, route as a voice-over-IP (VOIP) call to a cell phone number.

Further Embodiments

While the invention has been described with respect to specific embodiments, one skilled in the art will recognize that numerous modifications are possible.

The embodiments described herein may make reference to web sites, links, and other terminology specific to instances of communications systems. It should be understood that the systems and processes described herein can be adapted for use with a different data transport technology.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
    receiving, at an instant message IM server, a voice call for a telephone number from a PSTN telecommunications device;
    determining, via the IM server, routing preferences for the telephone number, the routing preferences indicating if the voice call should be routed to one or more IM usernames associated with the telephone number based upon a status of the one or more IM usernames;
    determining, via the IM server, if any of the one or more IM usernames associated with the telephone number that satisfy the routing preferences are on-line;
    causing, via the IM server for each of the one or more IM usernames that are online and satisfy the routing preferences, an IM client on a user device associated with the respective IM username to ring the respective on-line IM username for the voice call;
    routing, via the IM server, the voice call to one of the IM clients that answers the ring for the voice call;
    determining, via the IM server, if the IM client answers the call using an IM username; and
    causing, via the IM server, a change of the status of the IM username associated with the IM client that answered the ringing.

2. The method of claim 1, wherein the voice call is automatically forwarded from the PSTN telecommunications device to the IM server.

3. The method of claim 1, further comprising causing ringing of a PSTN phone for the telephone number in addition to the ringing of the on-line IM usernames.

4. The method of claim 1, further comprising:
    causing suppression of the ringing of on-line IM usernames other than the on-line IM client that answered the ringing.

5. The method of claim 4, further comprising causing suppression of the ringing of a PSTN phone when the on-line IM client answers the ring for the voice call.

6. The method of claim 1, further comprising:
    looking up a telephone number associated with the PSTN telecommunications device in a personal address book (PAB) for the IM username;
    determining a personal identifier for the telephone number associated with the PSTN telecommunications device from the PAB; and
    causing a display of the personal identifier on an IM client.

7. The method of claim 6, wherein the PAB is located at the IM server.

8. The method of claim 1, further comprising:
looking up a telephone number associated with the PSTN telecommunications device in a personal address book (PAB) for the IM username;
if the number associated with the PSTN telecommunications device is not in the PAB, determining identification information for the number associated with the PSTN telecommunications device; and
adding the personal information to the PAB for the IM username.

9. The method of claim 1, wherein determining if any IM usernames are on-line comprises determining a presence for the IM username and using the presence to determine if the IM username is on-line.

10. The method of claim 1, wherein causing the change of the status comprises causing a change of the status of the IM username for one or more groups in a plurality of groups.

11. A method comprising:
receiving a voice call for a telephone number;
determining routing preferences for the telephone number, the routing preferences indicating if the voice call should be routed to one or more IM usernames associated with the telephone number based upon a status of the one or more IM usernames;
if the preferences indicate the voice call should be routed to the one or more IM usernames, routing the voice call for the telephone number to an IM server, wherein the IM server is configured to determine if any of the one or more IM usernames associated with the telephone number are on-line and satisfy the routing preferences and if so, causing, for each of the IM usernames that are online, an IM client on a user device associated with the respective IM username to ring the on-line IM username for the voice call, and wherein the IM server is further configured to route the voice call to one of the IM clients that answers the ring for the voice calls;
determining if the IM client answers the call using an IM username; and
causing a change of the status of the IM username associated with the IM client that answered the ringing.

12. The method of claim 11, wherein the routing preferences indicate that voice calls for the telephone number should be forwarded to the IM server.

13. The method of claim 11, wherein the routing preferences indicate that voice calls for the telephone number should be forwarded to the IM server if the telephone number is busy.

14. The method of claim 11, wherein the voice call is a PSTN call.

15. The method of claim 11, wherein the voice call is a VOIP call.

16. A system comprising:
a telecommunications device configured to receive a PSTN voice call; and
an IM server comprising logic configured to:
determine routing preferences for a telephone number, the routing preferences indicating if the voice call should be routed to one or more IM usernames associated with the telephone number based upon a status of the one or more IM usernames;
determine if any of the one or more IM usernames associated with the telephone number are on-line and satisfy the routing preferences;
cause, for each of the one or more IM usernames that are online and satisfy the routing preferences, an IM client on a user device associated with the respective IM username to ring the respective on-line IM username for the voice call;
route the voice call to one of the IM clients that answers the ring for the voice call;
determine if the IM client answers the call using an IM username; and
cause a change of the status of the IM username associated with the IM client that answered the ringing.

17. The system of claim 16, wherein the IM client is configured to receive the voice call.

18. The system of claim 16, further comprising a PSTN telephone configured to receive the voice call from the telecommunications device.

19. The system of claim 16, wherein the voice call is sent through a PSTN network using the PSTN telecommunications device.

20. The system of claim 16, wherein the voice call is sent through a packet-based network using the IM server.

21. Computer readable storage medium tangibly comprising program code for routing voice calls for a telephone number using an instant message (IM) server, the program code for:
receiving a voice call for the telephone number from a PSTN telecommunications device;
determining routing preferences for the telephone number, the routing preferences indicating if the voice call should be routed to one or more IM usernames associated with the telephone number based upon a status of the one or more IM usernames;
determining if any of the one or more IM usernames associated with the telephone number are on-line;
causing, for each of the one or more IM usernames that are online, an IM client on a user device associated with the respective IM username to ring the respective on-line IM username for the voice call;
routing the voice call to one of the IM clients that answers the ring for the voice call;
determining if the IM client answers the call using an IM username; and
causing a change of the status of the IM username associated with the IM client that answered the ringing.

22. The computer readable storage medium of claim 21, wherein the voice call is automatically forwarded from the PSTN telecommunications device to the IM server.

23. The computer readable storage medium of claim 21, further comprising program code for causing ringing of a PSTN phone for the telephone number in addition to the ringing of the on-line IM usernames.

24. The computer readable storage medium claim 21, further comprising program code for:
causing suppression of the ringing of on-line IM usernames other than the on-line IM client that answered the ringing.

25. The computer readable storage medium of claim 24, further comprising program code for causing suppression of the ringing of a PSTN phone when the on-line IM client answers the ring for the voice call.

26. The computer readable storage medium of claim 21, further comprising program code for:
looking up a telephone number associated with the PSTN telecommunications device in a personal address book (PAB) for the IM username;
determining a personal identifier for the telephone number associated with the PSTN telecommunications device from the PAB; and
causing a display of the personal identifier on an IM client.

27. The computer readable storage medium of claim 26, wherein the PAB is located at the IM server.

28. The computer readable storage medium of claim 21, further comprising program code for:
   looking up a telephone number associated with the PSTN telecommunications device in a personal address book (PAB) for the IM username;
   if the number associated with the PSTN telecommunications device is not in the PAB, determining identification information for the number associated with the PSTN telecommunications device; and
   adding the personal information to the PAB for the IM username.

29. The computer readable storage medium of claim 21, wherein determining if any IM usernames are on-line comprises determining a presence for the IM username and using the presence to determine if the IM username is on-line.

30. The computer readable storage medium of claim 21 wherein causing the change of the status comprises causing a change of the status of the IM username for one or more groups in a plurality of groups.

* * * * *